(12) United States Patent
Arnout et al.

(10) Patent No.: US 12,462,143 B2
(45) Date of Patent: Nov. 4, 2025

(54) EVALUATION FRAMEWORK FOR TIME SERIES DATA

(71) Applicant: Siemens Aktiengesellschaft, Munich (DE)

(72) Inventors: Hiba Arnout, Munich (DE); Johanna Bronner, Munich (DE); Thomas Runkler, Munich (DE); Johannes Kehrer, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 833 days.

(21) Appl. No.: 17/765,319

(22) PCT Filed: Oct. 5, 2020

(86) PCT No.: PCT/EP2020/077805
§ 371 (c)(1),
(2) Date: Mar. 30, 2022

(87) PCT Pub. No.: WO2021/073919
PCT Pub. Date: Apr. 22, 2021

(65) Prior Publication Data
US 2023/0004783 A1 Jan. 5, 2023

(30) Foreign Application Priority Data
Oct. 17, 2019 (EP) ..................................... 19203894

(51) Int. Cl.
*G06N 3/045* (2023.01)
*G06N 3/084* (2023.01)
*G06N 3/088* (2023.01)

(52) U.S. Cl.
CPC ............. *G06N 3/045* (2023.01); *G06N 3/088* (2013.01); *G06N 3/084* (2013.01)

(58) Field of Classification Search
CPC ........ G06N 3/045; G06N 3/088; G06N 3/047; G06N 3/084
See application file for complete search history.

(56) References Cited

U.S. PATENT DOCUMENTS

2019/0188065 A1\* 6/2019 Anghel ................ G06F 11/0778
2019/0220733 A1\* 7/2019 Fisher ..................... G06N 3/088

FOREIGN PATENT DOCUMENTS

| CN | 109886403 A | 6/2019 |
| CN | 109902615 A | 6/2019 |
| CN | 110113288 A | 8/2019 |

OTHER PUBLICATIONS

Hyland et al., ("Real-Valued (Medical) Time Series Generation With Recurrent Conditional Gans" Published Dec. 4, 2017 (Total 13 Pages) (Year: 2017).\*

(Continued)

*Primary Examiner* — Quoc A Tran
(74) *Attorney, Agent, or Firm* — Schmeiser, Olsen & Watts LLP

(57) ABSTRACT

An evaluation framework for a generated dataset of a data generation algorithm such as a generative adversarial network is provided. The generated dataset includes a plurality of iterations of multiple instances of generated time series of data points. The evaluation framework provides multiple views. A first view includes at least one distance measure. The at least one distance measure is between the multiple instances of the generated time series and multiple instances of a reference time series, as a function of the plurality of iterations.

14 Claims, 7 Drawing Sheets

(56) References Cited

OTHER PUBLICATIONS

Figure 1:
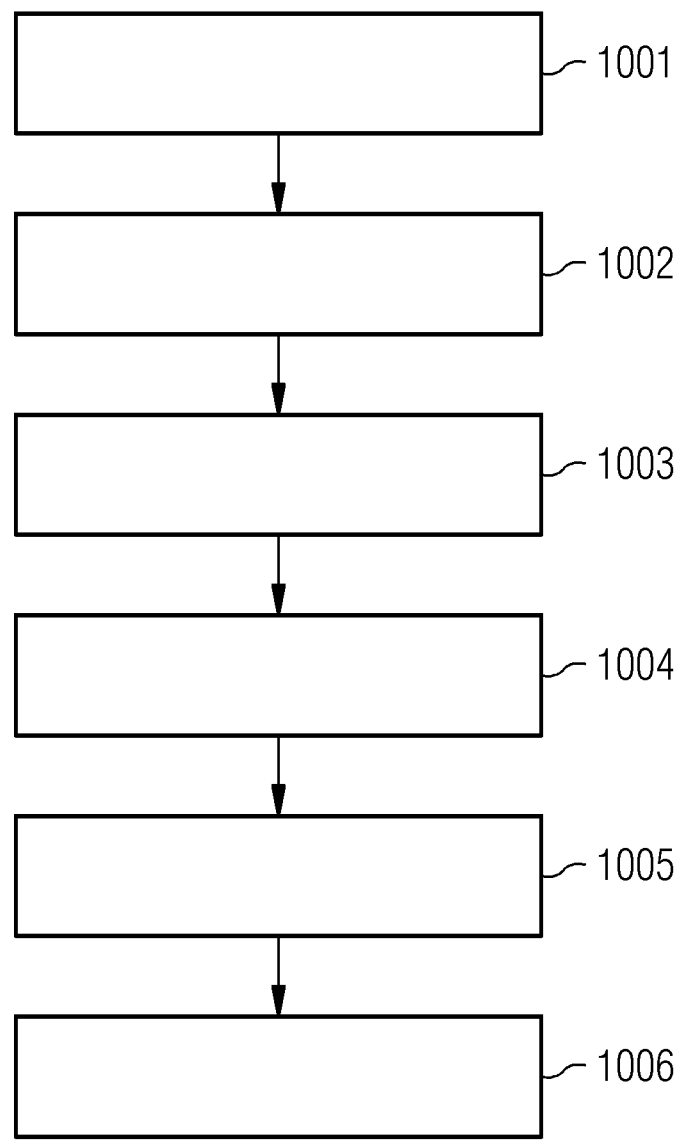

Mogren, O. 2016. C-rnn-gan: A continuous recurrent neural network with adversarial training. In Constructive MLML Work-shop (CML) at NIPS 2016, 1.); 2016.

Hartmann, Kay Gregoret et al.; "EEG-GAN: generative adversarial networks for electroencephalograhic (EEG) brain signals", arxiv. org, Cornell University Library, 201 Olin Library Cornell University Ithaca, NY 14853, XP080887460; Abstract; Sections 1, 2, 4, and 5; 2018.

Theis, L.; van den Oord, A.; and Bethge, M. 2016. A note on the evaluation of generative models. In International Conference on Learning Representations; 2016.

Salimans, T.; Goodfellow, I.; Zaremba, W.; Cheung, V.; Radford, A.; Chen, X.; and Chen, X. 2016. Improved tech-niques for training gans. In Lee, D. D.; Sugiyama, M.; Luxburg, U. V.; Guyon, I .; and Garnett, R., eds., Advances in Neural Information Processing Systems 29. Curran Associates, Inc. 2234-2242; 2016.

Delaney, Anne Marie et al.; "Synthesis of 5 Realistic ECG using Generative Adversarial Networks", arxiv.org, Cornell University Library, 201 Olin Library Cornell University Ithaca, NY 14853, XP081479353, Abstract; Sections 1, 3, 4, and 5; 2019.

Esteban, Cristobal, Hyland et al et al.; "Real-valued (Medical) Time Series Generation with Recurrent Conditional GANs", arxiv.org, Cornell University Library, 201 Olin Library Cornell University Ithaca, NY 14853, XP080768503, Abstract; Sections 1, and 3-6; 2017.

Goodfellow, I.J., Mirza, M., Ozair, S., Pouget-Abadie, J., Warde-Farley, D., & Xu, B. (2014). Generative Adversarial Nets. NIPS.; 2014.

Aigner, W.; Miksch, S.; Schumann, H.; and Tominski, C. 2011. Visualization of Time-Oriented Data. Springer Publishing Company, Incorporated, first edition.

Gogolou, Anna et al.; "Comparing Similarity Perception in Time Series Visualizations", IEEE Transactions on Visualization and Computer Graphics, IEEE Service Center, Los Alamitos, CA, US, vol. 25, No. 1, pp. 523-533, XP011699088, ISSN: 1077-2626, DOI: 10.1109/TVCG.2018.2865077; [retrieved on Dec. 7, 2018]; Abstract; Sections 1, 2, 5, and 6; 2019.

Kahng, Minsuk et al.; "GAN Lab: Understanding Complex Deep Generative Models using Interactive Visual Experimentation", arxiv. org, Cornell University Library, 201 Olin Library Cornell University Ithaca, NY 14853, XP081187569, DOI: 10.1109/TVCG.2018.2864500; Abstract; Sections 1, 2, 4-9; 2018.

Goldberger et al., "PhysioBank, PhysioToolkit, and PhysioNet: components of a new research resource for complex physiologic signals," circulation, vol. 101, No. 23, pp. e215-e220, 2000; 2000.

Bogl, Markus et al.; "Visual Analytics for Model Selection in Time Series Analysis", IEEE Transactions on Visualization and Computer Graphics, IEEE Service Center, Los Alamitos, CA, US, vol. 19, No. 12, pp. 2237-2246, XP011529792,; ISSN: 1077-2626, DOI: 10.1109/TVCG.2013.222; [retrieved on Oct. 16, 2013]; Abstract; Sections 1, 3, 5, and 6; 2013.

Aigner, W.; Miksch, S.; Muller, W.; Schumann, H.; and Tominski, C. 2008. Visual methods for analyzing time-oriented data. IEEE Transactions on Visualization and Computer Graphics 14(1):47-60; 2008.

PCT International Search Report and Written Opinion of International Searching Authority mailed Sep. 2, 2021 corresponding to PCT International Application No. PCT/EP2020/077805 filed May 10, 2020.

Shi Mohan et al:"An interpretable gait recognition method based on time series features", Scientia Sinica Informationis, vol. 50, No. 3, p. 438-460, Mar. 5, 2020.

\* cited by examiner

EVALUATION FRAMEWORK FOR TIME SERIES DATA

CROSS-REFERENCE TO RELATED APPLICATIONS

This application claims priority to PCT Application No. PCT/EP2020/077805, having a filing date of Oct. 5, 2020, which claims priority to EP Application No. 19203894.1, having a filing date of Oct. 17, 2019, the entire contents both of which are hereby incorporated by reference.

FIELD OF TECHNOLOGY

The following relates to configuring a data generation algorithm, such as a generative adversarial network, that is configured to generate a training dataset comprising a training time series of data points. The following specifically relates to an evaluation framework of generated time series of data points provided by the data generation algorithm

BACKGROUND

Time-dependent information arises in many fields ranging from meteorology, medicine to stock markets. The analysis of such time series of data points is a central goal in visual analytics, statistics, or machine learning (ML) and many related approaches exist. See Aigner, W.; Miksch, S.; Muller, W.; Schumann, H.; and Tominski, C. 2008. Visual methods for analyzing time-oriented data. IEEE Transactions on Visualization and Computer Graphics 14(1):47-60. Also see Aigner, W.; Miksch, S.; Schumann, H.; and Tominski, C. 2011. Visualization of Time-Oriented Data. Springer Publishing Company, Incorporated, first edition. For example, a machine learning algorithm can detect features in the time series and classify the features. Thereby, it would be possible to detect malfunctioning of machines, implement predictive maintenance, detect wear-out of machines, detect abnormal system states of a machine, etc. Various such use cases are conceivable.

A machine-learning (ML) algorithm is trained based on training data. It is necessary to accurately train the ML algorithm, based on a sufficient amount of training data, as well as a balanced training dataset (i.e., each feature class is equally well represented).

In reality, ML experts often face situations where these criteria are not satisfied. For example, when commissioning a new machine, a cold-start problem may occur: here, because the machine is only about to commence operation, a measurement dataset provided by the machine is not yet available for training. Transfer learning—i.e., relying on measurement datasets from further machines, e.g., of the same type—is not always in appropriate solution: in particular, feature classes can even vary significantly between different machines of the same type.

To mitigate such problems, generating new data, i.e., generating a new training dataset, can provide a possible solution. The training dataset can be generated based on a comparable limited amount of information, i.e., a small measurement dataset of a measurement. The training dataset may not only include generated data, but also measurement data.

This has pushed researchers to deeply investigate new methods for data generation. In this context, Generative Adversarial Networks (GANs)—see Goodfellow, I.; Pouget-Abadie, J.; Mirza, M.; Xu, B.; Warde-Farley, D.; Ozair, S.; Courville, A.; and Bengio, Y. 2014. Generative adversarial nets. In Ghahramani, Z.; Welling, M.; Cortes, C.; Lawrence, N. D.; and Weinberger, K. Q., eds., Advances in Neural Information Processing Sys-tems27. Curran Associates, Inc. 2672-2680.—show an outstanding performance in generating training datasets. GANs implement a data generation algorithm to provide generated training datasets (sometimes also referred to as artificial training datasets).

However, to trust an ML algorithm which was trained on a generated training dataset, it is typically desirable to assess how realistic the generated training dataset is; in other words, the performance of the data generation algorithm should be evaluated.

Most efforts and best results have been shown for image generation, where the quality of the generated training dataset can be easily assessed with the human eye. This is because the human brain is capable to intuitively detect abnormalities in visualized 2-D images.

However, while human-understandable 2D images can be evaluated by an experienced ML expert, this becomes more difficult for technical data, in particular, technical time series of data points. For example, it is often difficult for a human to detect abnormalities in a time series of data points indicating a pressure distribution in a turbine or an electrocardiogram of a patient, or other medical or industrial or generally technical data. Such time series in many cases cannot be interpreted intuitively.

On the other hand, it has been shown that, in principle, data generation algorithms are also available for generating time series of data points. See C Esteban, S L Hyland, G. R. 2017. Real-valued (medical) time series generation with recurrent conditional gans. In arXiv preprint arXiv: 1706.02633.

SUMMARY

Accordingly, an aspect relates to advanced techniques of generating datasets including time series of data points. In particular, a need exists for advanced techniques of configuring a data generation algorithm to generate the time-series training datasets. As the generated dataset is used as training dataset to train a ML algorithm, there is a need to assess how realistic the generated training dataset is related to available real datasets.

The techniques described herein generally solve this problem by providing an evaluation framework for assessing the quality of generated training datasets including time series of data points.

The evaluation framework can include a workflow for visual analytics (VA) of the generated time series of data points obtained from a data generation algorithm. Such workflow provides human-machine interaction to guide an user in the evaluation of training datasets and enabling the user to select the appropriate configuration of the data generation algorithm. The workflow makes real and generated time series of data points comparable by combining VA with algorithmic methods. Thereby, the techniques enable the user to trust the GAN configuration.

The evaluation framework can generally include one or more views. The various views can have a different level of abstraction or dimensionality reduction. For example, a first view (labeled iteration view, hereinafter) can include one or more plots that show, as a function the iteration, at least one distance measure between the generated time series of data points and the reference time series of data points.

As a general rule, different iterations correspond to different configurations of the GANs. For example, different configurations can correspond to different parameter values of parameters of the configuration.

Thus, the iteration view corresponds to an overview visualization at a high level of abstraction that helps the user to identify interesting iterations of the GAN generation process.

A second view (labeled instance view, hereinafter) can include, for a selected one of the iterations or for multiple selected iterations of the plurality of iterations, a plot of multiple instances of the generated time series of data points using the configuration at that iteration.

As a general rule, the various instances can correspond to the outputs of the data generation algorithm at the respective configuration of the respective iteration, using different seed values (e.g., different instantiation noise).

The instance view, hence, enables a detailed comparison where the time series are visualized in a compact manner, at lower level of abstraction/higher level of detail.

As a general rule, the instances of the time series may be ordered using, e.g., Principal Components Analysis (PCA), to facilitate comparison by juxtaposition.

A method of configuring a data generation algorithm for generating a generated dataset. The generated dataset includes a time series of data points. The method includes obtaining multiple instances of a reference time series of data points. The method also includes iteratively adjusting a configuration of the data generation algorithm, based on the multiple instances of the reference time series. The method also includes executing the data generation algorithm with the respectively adjusted configuration, to thereby obtain a plurality of iterations of multiple instances of a generated time series of data points. The method further includes outputting, to a human-machine-interface, a first view of at least one distance measure. The at least one distance measure is between the multiple instances of the reference time series and the multiple instances of the generated time series. The first view provides the at least one distance measure as a function of the plurality of iterations. The method further includes obtaining, from the human-machine-interface, a user input indicative of a selected iteration of the plurality of iterations.

Further the at least one distance measure comprises a first distance measure which is based on nearest-neighbor distances of each of the multiple instances of the generated time series to the multiple instances of the reference time series.

It is also possible that the at least one distance measure comprises a second distance measure which is based on nearest-neighbor distances of each of the multiple instances of the reference time series to the multiple instances of the generated time series.

The first view may comprise a first plot of the first distance measure and may further comprise a second plot of the second distance measure. The first plot and the second plot may have a common axis associated with the plurality of iterations.

The first plot and the second plot of the first view may include 2-D heatmap plots for the first distance measure and the second distance measure as a function of the plurality of iterations and a function of the multiple iterations.

The at least one distance measure may comprise a first distance measure indicative of a similarity between time-domain shapes of the data points of the generated time series with respect to the reference time series.

The at least one distance measure may comprise a second distance measure indicative of a variation strength of time-domain shapes of the data points of the generated time series with respect to the reference time series.

It is possible that the first view comprises at least one plot showing the at least one distance measure for each one of the multiple instances of the reference time series and/or the generated time series.

The method may further include: outputting, to the human-machine-interface, a second view comprising an amplitude or phase of the multiple instances of the generated time series for the selected iteration of the plurality of iterations.

The second view may comprise a first plot in which the amplitude or phase of the multiple instances of the reference time series is shown. The second view may comprise a second plot in which the amplitude or phase of the multiple instances of the generated time series is shown for the selected iteration of the plurality of iterations. The first plot and the second plot may share a common axis for the multiple instances.

The plot of the second view may comprise 2-D heatmaps for the amplitude or phase of the selected iteration of the plurality of iterations of the generated time series and of the reference time series, as a function of the multiple iterations and as a function of time.

The method may further comprise: obtaining, from the human-machine-interface, a further user input indicative of a selected instance of the multiple instances of the selected iteration of the plurality of iterations, and outputting, to the human-machine-interface, a third view indicative of the amplitude or phase of the selected instance of the multiple instances of the selected iteration of the plurality of iterations, as a function of time.

The third view may comprise at least one line plot of the amplitude or phase of the selected instance of the multiple instances of the selected iteration of the plurality of iterations. The line plot may comprise a statistical reference of the amplitude or phase of the multiple instances of the reference time series.

The method may further comprise: sorting at least one of the multiple instances of the reference time series or the generated time series.

It is possible that said sorting is based on at least one of a further user input, the at least one distance measure, or a principle component analysis of the data points of each one of the multiple instances of the at least one of the reference time series or the generated time series.

The method may further comprise, based on the user input, configuring at least one of the data generation algorithm or a training process of the data generation algorithm.

The method may further comprise: based on the user input, adjusting a parameter space sampling scheme of the configuration of the data generation algorithm during a training process of the data generation algorithm.

It is possible that the generated dataset is for training a machine-learning algorithm. The method may further comprise: executing the data generation algorithm based on the user input, to thereby obtain the generated dataset, and training the machine-learning algorithm using the generated dataset.

The method may further comprise: using the trained machine-learning algorithm to recognize features in sensor data.

It is possible that the data generation algorithm comprises a generative adversarial network comprising a generator and a discriminator.

A computer program or a computer-program product (non-transitory computer readable storage medium having instructions, which when executed by a processor, perform actions) or a computer-readable storage medium includes program code. The program code can be executed by at least one processor. Executing the program code causes the at least one processor to perform a method of configuring a data generation algorithm for generating a generated dataset for a machine-learning algorithm. The generated dataset includes a time series of data points. The method includes obtaining multiple instances of a reference time series of data points. The method also includes iteratively adjusting a configuration of the data generation algorithm, based on the multiple instances of the reference time series. The method also includes executing the data generation algorithm with the respectively adjusted configuration, to thereby obtain a plurality of iterations of multiple instances of a generated time series of data points. The method further includes outputting, to a human-machine-interface, a first view of at least one distance measure. The at least one distance measure is between the multiple instances of the reference time series and the multiple instances of the generated time series. The first view provides the at least one distance measure as a function of the plurality of iterations. The method further includes obtaining, from the human-machine-interface, a user input indicative of a selected iteration of the plurality of iterations.

A device includes program code. The program code can be executed by at least one processor. Executing the program code causes the at least one processor to perform a method of configuring a data generation algorithm for generating a generated dataset for a machine-learning algorithm. The generated dataset includes a generated time series of data points. The method includes obtaining multiple instances of a reference time series of data points. The method also includes iteratively adjusting a configuration of the data generation algorithm, based on the multiple instances of the reference time series. The method also includes executing the data generation algorithm with the respectively adjusted configuration, to thereby obtain a plurality of iterations of multiple instances of a generated time series of data points. The method further includes outputting, to a human-machine-interface, a first view of at least one distance measure. The at least one distance measure is between the multiple instances of the reference time series and the multiple instances of the generated time series. The first view provides the at least one distance measure as a function of the plurality of iterations. The method further includes obtaining, from the human-machine-interface, a user input indicative of a selected iteration of the plurality of iterations. Further on the at least one distance measure comprises a first distance measure which is based on nearest-neighbor distances of each of the multiple instances of the generated time series to the multiple instances of the reference time series.

It is to be understood that the features mentioned above and those yet to be explained below may be used not only in the respective combinations indicated, but also in other combinations or in isolation without departing from the scope of embodiments of the invention.

BRIEF DESCRIPTION

Figure 2:
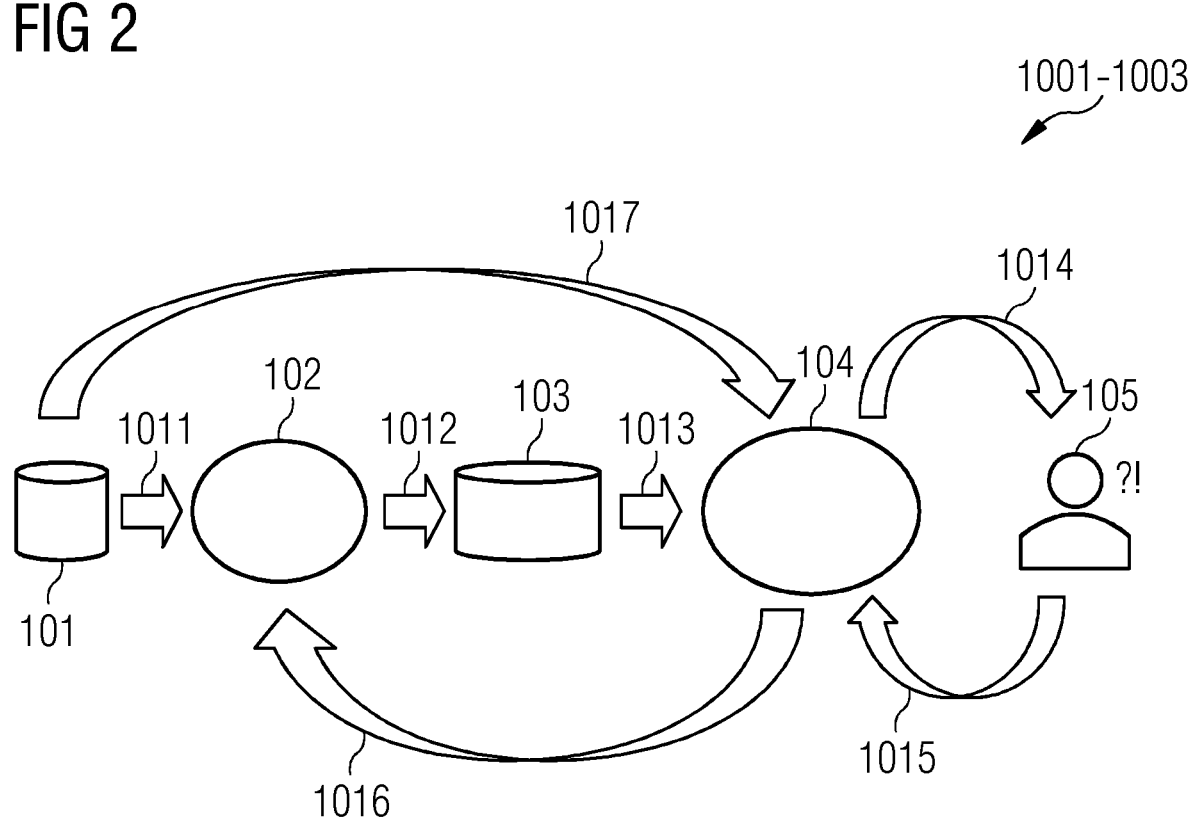
Figure 3:
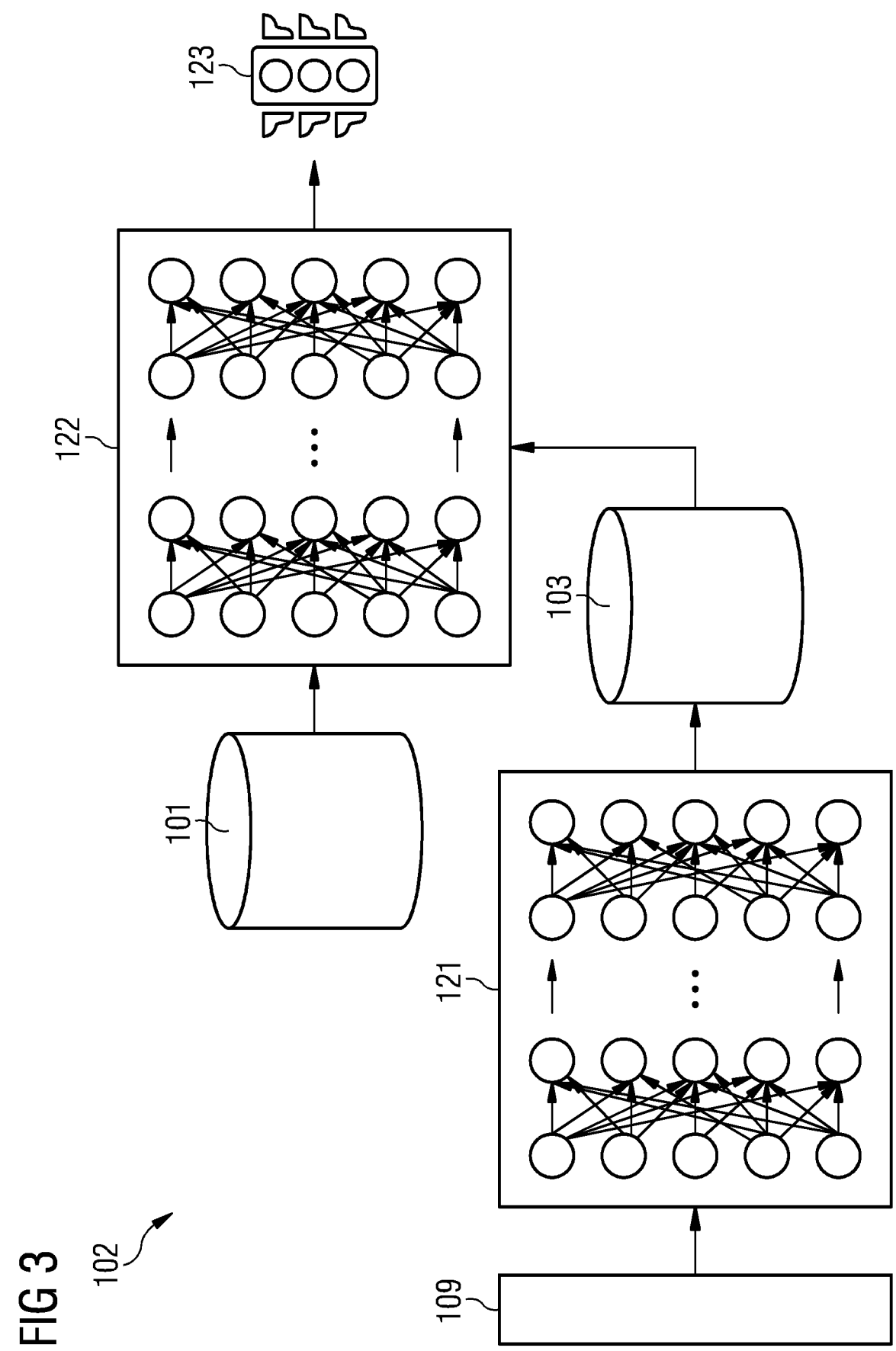
Figure 4:
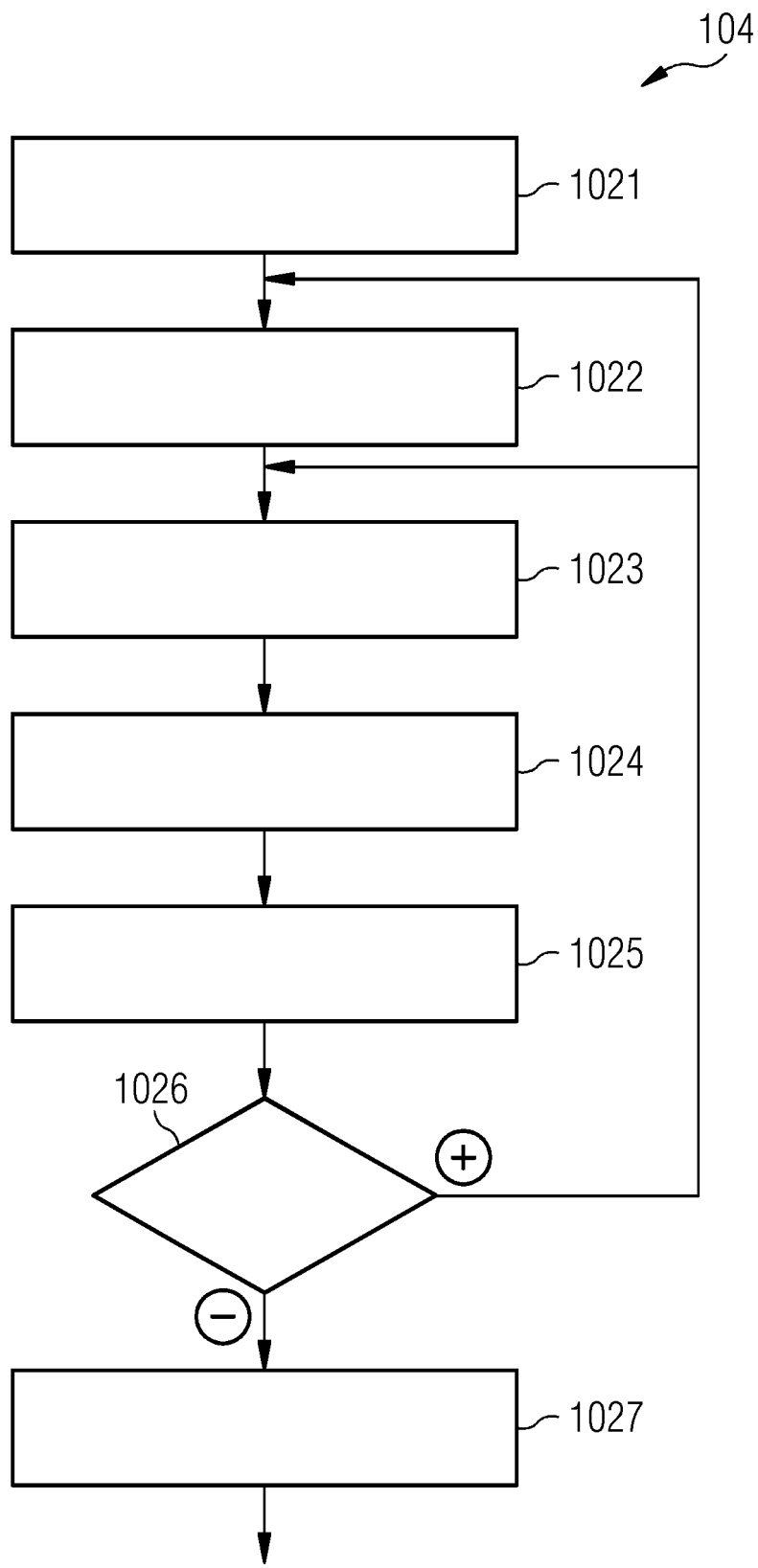
Figure 5:
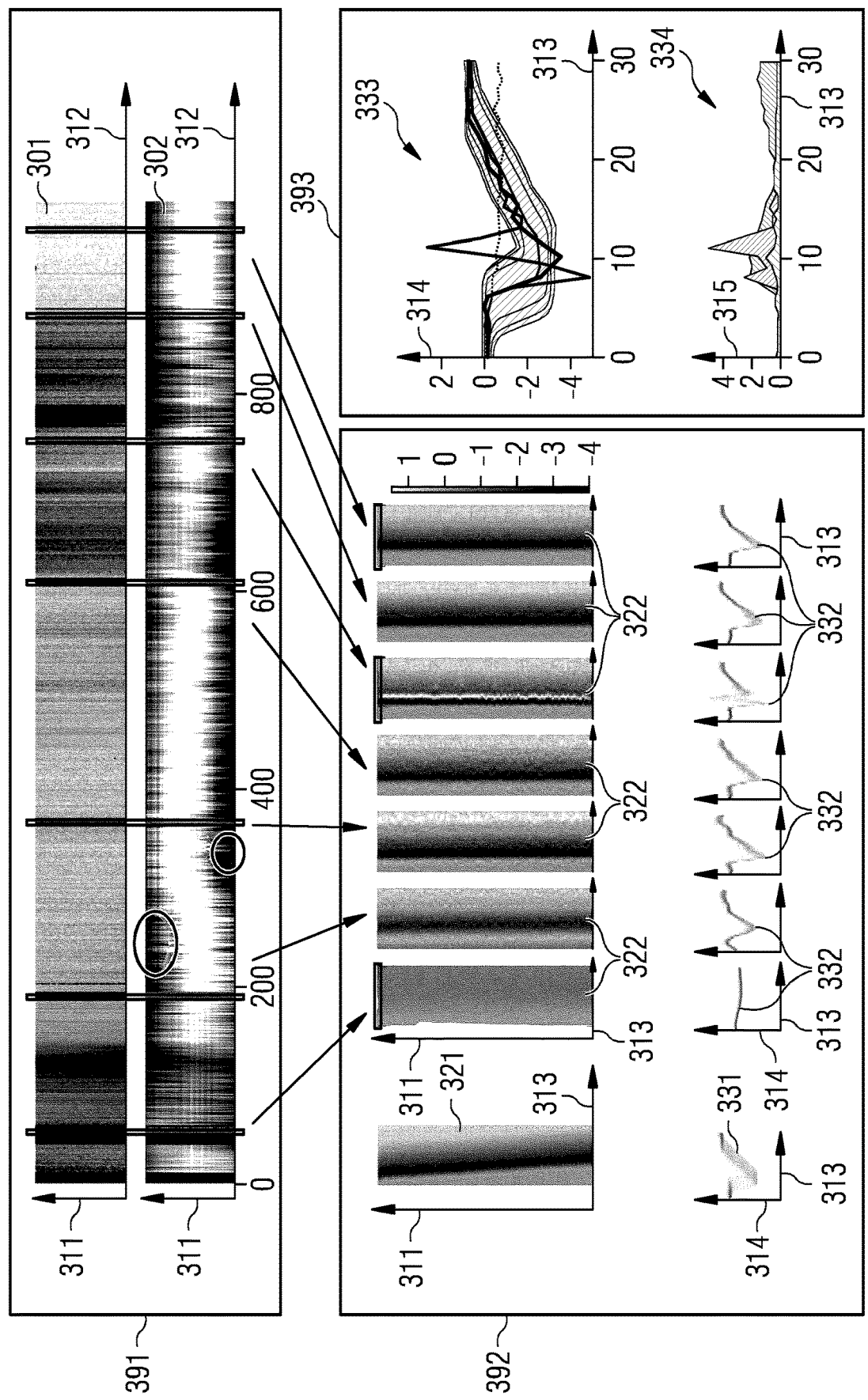
Figure 6:
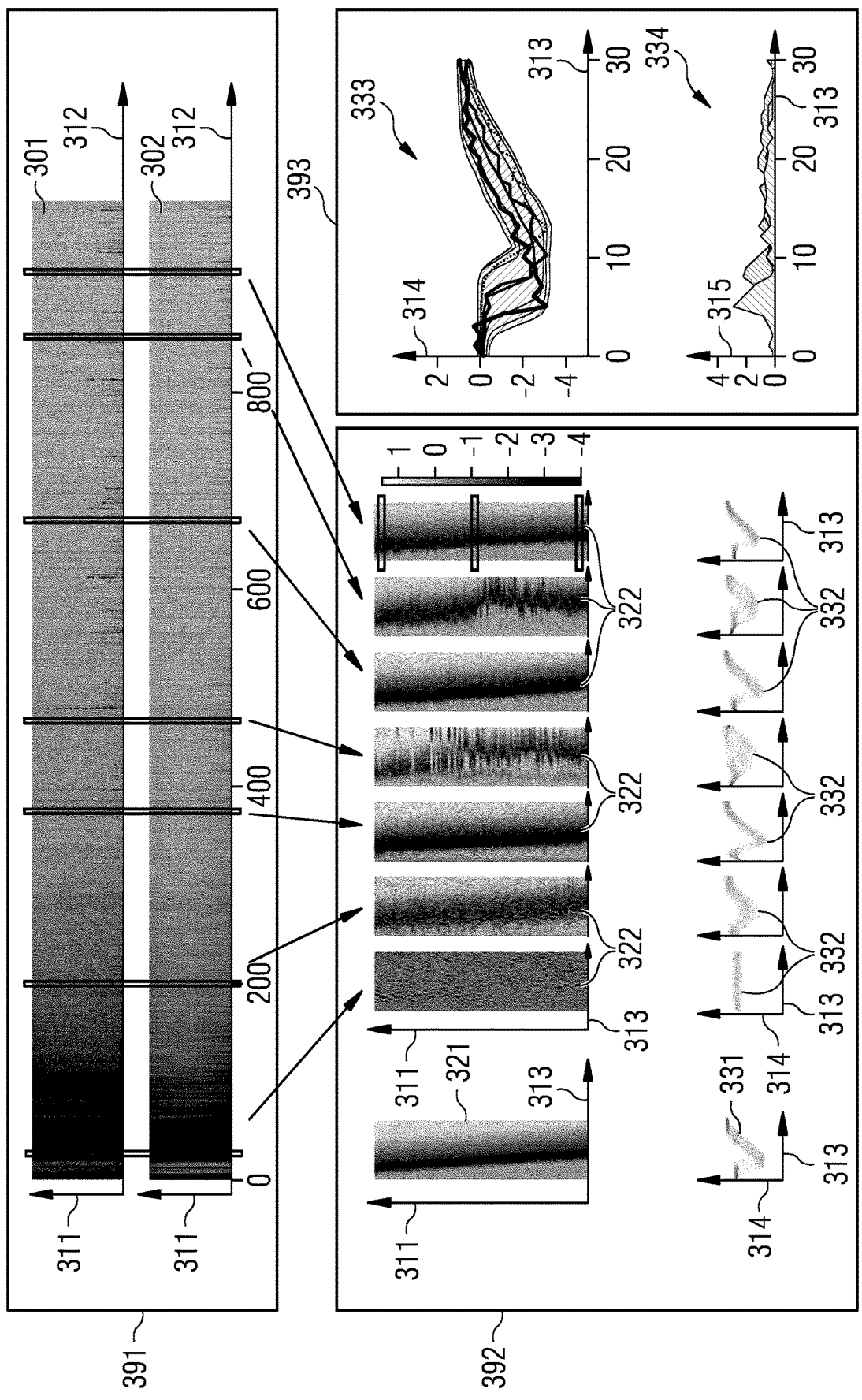
Figure 7:
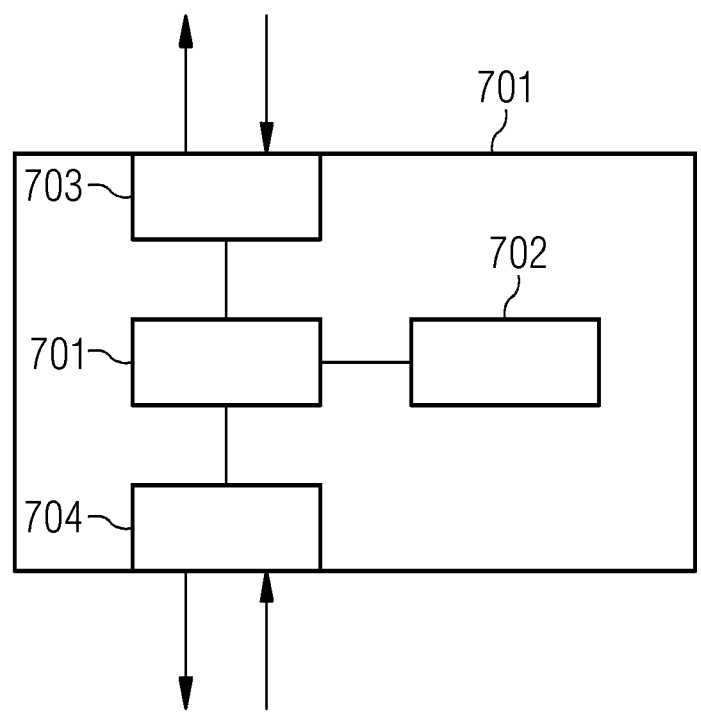

Some of the embodiments will be described in detail, with reference to the following figures, wherein like designations denote like members, wherein:

FIG. 1 is a flowchart of a method according to various examples;

FIG. 2 schematically illustrates a workflow including an evaluation framework according to various examples;

FIG. 3 schematically illustrates a GAN according to various examples;

FIG. 4 is a flowchart of a method according to various examples;

FIG. 5 schematically illustrates multiple views of an evaluation framework according to various examples;

FIG. 6 schematically illustrates multiple views of an evaluation framework according to various examples; and FIG. 7 schematically illustrates a device according to various examples.

DETAILED DESCRIPTION

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are described that facilitate finding an appropriate configuration for a data generation algorithm.

The techniques can be used to assess a result of a data generation algorithm training process; alternatively or additionally, the techniques can be used during the data generation algorithm training process, and it is possible to configure the data generation algorithm training process based on the techniques described herein to thereby find the appropriate configuration.

The data generation algorithm can generate a generated dataset. The data generation algorithm may do so based on a reference dataset that can include measurement data. In the various examples described herein, the datasets include multiple instances of a time series of data points. I.e., time-resolved data is considered.

As a general rule, various options are available for using the generated dataset. In one example, the generated dataset implements a training dataset for training an ML algorithm. Another example would relate to the generated dataset implementing a test dataset. The test dataset can be used to test, e.g., functionality of an integrated circuit. Hereinafter, various examples are described with respect to the generated dataset implementing a training dataset, for sake of simplicity. The training dataset is for training an ML algorithm. However, similar techniques can be readily applied for different purposes of the generated dataset.

As a general rule, various options exist for implementing the data generation algorithm. An example implementation is a GAN including a generator and a discriminator. Hereinafter, for sake of simplicity, various examples will be described in connection with configuring the GAN; however, respective techniques may be readily applied to other kinds and types of data generation algorithms. There are different types of GANs available, e.g., CGAN, InfoGAN, etc. An alternative implementation may use a Variational Autoencoder (VAE).

As a general rule, configuring GAN can include determining a configuration of the generator of the GAN and/or of the discriminator of the GAN. For example, one or more parameter values of parameters of the configuration of the GAN can be set. For example, it would be possible to set hyperparameter values of hyperparameters of the configuration of the GAN. Example hyperparameters include: type of noise; number of layers of the generator; number of layers of the discriminator; hyperparameters of the generator; hyperparameters of the discriminator; etc.

As a general rule, there can be various objectives that influence whether the configuration of the GAN is appropriate. For example, an appropriate configuration may be a configuration that enables to generate a training dataset including multiple instances of a time series of data points for accurately training an ML algorithm. In such a scenario, the generated time series should mimic reference time series of a reference dataset (e.g., real measurement data, etc.) accurately.

Various techniques are based on the finding that generated time series of data points typically mimic reference time series of data points if, at least, two criteria are fulfilled: (i) A time-domain shape of the data points of the generated time series should be exhibiting a strong similarity with the time-domain shape of the reference time series. I.e., the time-domain evolution of amplitude and/or phase of the data points should be similar for the generated time series and the reference time series. (ii) A variation strength of the time-domain shapes of the data points of the generated time series should be approximately equal to the variation strength of the time-domain shapes of the data points of the reference time series. This is to avoid a problem sometimes referred to as "mode collapse": here, multiple feature classes included in the reference dataset may not be appropriately reflected in the generated dataset obtained from the GAN. For instance, a given one of the different feature classes may be overrepresented. Then, the variation strength of the time-domain shapes of the data points of the multiple instances of the generated time series may be smaller than the variation strength of the time-domain shapes of the data points of the multiple instances of the reference time series. This is because not all required time-domain shapes are included in the generated dataset.

The techniques described herein can be generally used to evaluate the performance of a GAN or a training process of the GAN. Various techniques described herein provide an evaluation framework that enable to accurately assess whether the multiple instances of the generated time series of data points appropriately mimics the multiple instances of the reference time series of data points, e.g., taking into account the above-identified criteria (i) and (ii). The techniques described herein facilitate a fast and reliable evaluation by a user. In the techniques described herein it is typically not required that the user has specific domain knowledge of the particular use case/information content included in the time series of data points. Rather, the evaluation framework facilitates an analysis of the generated dataset based on statistical figures of merits and, as such, is widely applicable across various use cases.

The techniques can find application in various use cases. In particular, the information content of the datasets can vary. For instance, the datasets could include time series of medical measurement data points such as electrocardiograms, blood-flow data, etc; another example includes speech measurement data points, e.g., voice recordings; another example includes industry measurement data points such as flow measurements in turbines or windparks or engines, data points of an acceleration or position sensor, e.g., of trains, subways, airplanes, temperature data points, e.g., for electrical power transmission equipment, pressure data points, e.g., for subsea equipment, and so forth. As will be appreciated, as a general rule, the datasets can capture a time-domain dynamics of a physical or technical or physiological process.

As a general rule, the GAN training process can have a plurality of iterations. For each iteration of the plurality of iterations, the parameter values of parameters of a configuration of the GAN are varied. Then, based on multiple instances of a reference time series of data points, the GAN can be executed with the respectively adjusted configuration. Per iteration, the GAN outputs multiple instances of the time series of data points. As a result of the GAN training process, a plurality of iterations of multiple instances of a generated time series of data points can be obtained. Thus, there are, firstly, multiple iterations, and, secondly, each iteration has multiple instances of the time series of data points. For example, different instances of the reference time series can be associated with different seed values for the operation of the GAN, e.g., noise having a random contribution that is provided as an input to the generator. It has been found that it is difficult to evaluate such a large amount of data.

The techniques described herein help to achieve the following goals:

Goal 1: Find iterations of the GAN training process where an appropriate behavior is achieved, i.e., the iterations showing a sufficient quality of the multiple instances of the generated time series. For example, this enables to check if the number of iterations of the training process is sufficient, or whether a higher number of iterations is needed.

Goal 2: Compare the performance of different GAN configurations—e.g., having different configurations for the generator and/or the discriminator, or having different hyperparameter values—and support the user in the decision making process to either trust or reject a given configuration. Hence, the user should be able to identify which GAN configuration is appropriate for the task.

Goal 3: Present an adequate workflow to visually evaluate the quality of the multiple instances generated time series of data points, for the plurality of iterations. I.e., detect if the multiple instances of the generated time series are noisy or show a different behavior compared to the multiple instances of the reference time series. Users should be able to decide whether the multiple instances of the generated time series of data points generated by the GAN are realistic.

Goal 4: Detect common GAN training problems such as non-convergence or mode collapse. Mode collapse describes a scenario in which the generator collapses to one mode (i.e., one feature class) and is not able to produce diverse samples. The techniques described herein offer the possibility to identify mode collapse. Once the mode collapse is detected, the user can use existing techniques to improve the performance of the considered GAN model, e.g., Salimans, T.; Goodfellow, I.; Zaremba, W.; Cheung, V.; Radford, A.; Chen, X.; and Chen, X. 2016. Improved techniques for training gans. In Lee, D. D.; Sugiyama, M.; Luxburg, U. V.; Guyon, I.; and Garnett, R., eds., *Advances in Neural Information Processing Systems* 29. Curran Associates, Inc. 2234-2242.

According to examples, this is achieved by outputting, to a human-machine-interface (HMI), one or more views. Each view can include one or more plots.

A first view includes at least one distance measure between the multiple instances of the reference time series and the multiple instances of the generated time series, as a function of the plurality of iterations of the training process.

For instance, heatmap plots could be used in which color/contrast is used to encode the value of the distance measure; thereby, the distance measure can be shown for each instance. Another option would be a line plot that encodes a distance measure averaged or otherwise condensed across the instances.

By using the first view that illustrates the at least one distance measure as a function of the plurality of iterations, a high-level overview of the performance of the GAN can be provided.

Then, it is possible to obtain, from the HMI, a user input indicative of a selected iteration of the plurality of iterations. Based on this user input, a further view can be configured.

The evaluation framework is not limited to the first view. In particular, as part of a continued interaction between the user and the HMI, one or more further views can be activated.

For instance, a second view can include amplitude and/or phase as a function of the multiple instances of a selected one of the plurality of iterations.

The selected one of the plurality of iterations can be obtained from a user input that is made based on the first view.

By using the second view that illustrates the multiple instances of the time series of data points for a selected iteration (i.e., does not show details with respect to the non-selected iterations), a closer inspection of the time-domain shapes of the data points of the generated time series can be made.

The evaluation framework could include a third view that illustrates the amplitude and/or phase of a selected instance of a selected iteration, as a function of time. For example, the third view can include a respective line plot of the amplitude or phase. Again, the selected instance may be determined based on a user input indicative thereof that is made based on the second view.

As will be appreciated from the above, multiple views can be provided, wherein the multiple views correspond to different levels of abstraction. For example, the first view can provide a general overview of the behavior of the training process, while the second and third views can provide a higher level of detail.

As will be further appreciated from the above, the user can navigate through the multiple views by selecting iterations or selecting instances of interest. Such continued user-machine-interaction can make the large amount of data processable and accessible for evaluation.

FIG. 1 is a flowchart of a method according to various examples.

At box 1001, a training process of a GAN is executed. The training process can include a plurality of iterations. For each iteration of the plurality of iterations, the GAN is executed with a respective configuration. In other words, the configuration of the GAN is iteratively adjusted, e.g., a configuration of the generator and/or a configuration of the discriminator of the GAN.

In particular, parameter values of the parameters of the generator and/or the discriminator can be altered. For example, backpropagation can be used, along with gradient descent, to sample the parameter space of the parameter values of the generator and the discriminator. For example, weights of the respective neural networks may be adjusted as parameter values.

The execution of the GAN is based on multiple instances of a reference time series of data points, also obtained as part of box 1001. For example, the reference time series of data points can be obtained from a measurement.

Thereby, a generated dataset including, for each of the plurality of iterations, multiple instances of a generated time series of data points is obtained, at box 1002. The generated dataset is a candidate for a training dataset of a ML algorithm At box 1003, an evaluation of the performance of the GAN is performed. Box 1003 includes outputting, to an HMI, one or more views of an evaluation framework. The performance of the GAN is evaluation in view of the training process. In other words, the performance of the GAN can be evaluated for the different configurations associated with the plurality of iterations of the training process.

The first view includes at least one distance measure between the multiple instances of the reference time series and the multiple instances of the generated time series, as a function of the plurality of iterations.

Based on the first view, it is then possible to obtain a user input indicative of a selected iteration of the plurality of iterations.

Based on such user input, it is then possible, at box 1004, to configure the GAN and/or the training process of the generative adversarial network.

As a general rule, there are various options available for implementing such configuration. For instance, the configuration of the GAN associated with the selected iteration of the plurality of iterations can be used to then determine a training dataset. Alternatively or additionally, it would be possible to adjust the configuration of the GAN, by appropriately configuring the training process of the GAN. In such case, it would be possible that box 1001—box 1003 are re-executed, using the adjusted configuration of the training process. For instance, a parameter space sampling scheme of the configuration of the GAN during the training process can be adjusted based on the user input (e.g., deviating from gradient descent). Thereby, an appropriate configuration can be quickly found, because the parameter space of available configurations is efficiently sampled, towards an optimum. Yet another option would be associated with adjusting a hyperparameter value of a hyperparameter of the GAN, e.g., a number of layers of the discriminator and/or the generator, a type of noise considered, etc.

Then, at box 1005, the GAN can be executed, in accordance with the configuration of box 1004, i.e., based on the user input. Thereby, the training dataset is obtained and, at box 1005, the ML algorithm can be trained based on the training dataset.

Then, at box 1006, it is possible to recognize features based on the respectively trained ML algorithm. The features can be recognized in sensor data, e.g., from a machine, a medical equipment, surveillance equipment, etc.

Based on the techniques described herein, it is possible to accurately train the ML algorithm such that the features can be accurately recognized in the sensor data.

As will be appreciated from the above, box 1003 provides an evaluation framework for the performance of the GAN. Details with respect to the evaluation framework and a workflow associated there with are described next in connection with FIG. 2.

FIG. 2 is a schematic illustration of a workflow facilitating and evaluation of the performance of a GAN. The workflow includes the execution of an evaluation framework 104.

At 1011, a reference dataset is obtained; i.e., multiple instances of a reference time series 101 are obtained. The multiple instances of the reference time series 101 are provided as an input to a GAN 102.

At 1012, the training process of the GAN is executed (cf. FIG. 1: box 1001). Accordingly, the GAN 102 outputs a plurality of iterations, each iteration including multiple instances of a generated times series 103 of data points.

An evaluation framework 104 enables the evaluation of the performance of the GAN 102. For this, the plurality of iterations of the multiple instances of the generated time series 103 are provided to the evaluation framework 104 at 1013. At 1017, the multiple instances of the reference time series are provided to the evaluation framework.

The evaluation framework 104 provides, at 1014, one or more views to a user 105; and obtains, at 1015, one or more user inputs from the user 105.

The user 105 may interact with the evaluation framework to get further insight about the data and their properties. After a rigorous exploration of the data, he or she can decide to terminate the training process if the desired behavior is achieved; a respective configuration of the GAN can be selected. Otherwise, he or she can adjust the configuration of the GAN. The configuration of the GAN 102 is adjusted or set based on a feedback, provided by the evaluation framework at 1016.

An example implementation of the workflow of FIG. 2 is given next: The user 105 starts the process by executing the GAN 102, to generate a plurality of iterations, each iteration including multiple instances of the generated time series 103. The evaluation framework 104 is then used to check whether the GAN configuration and the generated time series fulfill the desired requirements, e.g., at least for one of the plurality of iterations. If this is the case, the user 105 has succeeded to generate realistic time series and can stop the configuration process. The training dataset can be generated using the respective configuration. Otherwise he or she can re-execute the GAN 102 with a different configuration—e.g., adjusted parameter values or hyperparameter values—and repeat the investigations using the evaluation framework 104. It should be noted that an online evaluation is possible, i.e. the evaluation framework 104 can be used during the training process, e.g., by configuring the training process. As the training process can take up to several days, such approach may help to save valuable time by making sure during the training process that the variation of the parameter values of the configuration of the GAN 102 is going in the right direction or restart the training process if an unexpected behavior is detected.

FIG. 3 schematically illustrates aspects with respect to the GAN 102. The GAN 102 includes the generator 121 and the discriminator 122. The discriminator obtains, as an input, the multiple instances of the reference time series 101. The generator 121 obtains, as an input, noise 109. The generator 121 outputs the multiple instances of the generated time series 103 of data points. These are compared, at the discriminator 122 to the multiple instances of the reference time series 101. The output of the discriminator 122 is an indication 123 whether the generated time series 103 can be distinguished from the reference time series 101.

A GAN can be briefly described as a minimax game between two neural networks, i.e., the generator and the discriminator. The discriminator is typically a binary classifier that tries to maximize its log-likelihood to learn to perfectly distinguish between the real and the generated data. At the same time, the generator is typically trying to minimize the log-probability of the generated samples that are recognized as false. The configuration of the generator 121 and the discriminator 122 is accordingly adjusted in accordance with the respective losses across the plurality of iterations.

A challenge is to decide if the data produced by generator 121 sufficiently represent the original reference dataset. Much efforts are made by researchers to discover suitable metrics to evaluate the performance of GAN and can substitute a human judge. The discriminator 122 and generator 121 losses, for example, cannot be considered as a measure of GAN performance and this ML approach lacks an objective function that defines an appropriate end of iteration with suitable data quality. Various evaluation methods have been described in Theis, L.; van den Oord, A.; and Bethge, M. 2016. A note on the evaluation of generative models. In *International Conference on Learning Representations*, such as Parzen window or Maximum Mean Discrepancy (MMD). As proven in id., the use of these methods has various disadvantages. Other methods i.e. inception score are designed only for images and cannot be easily applied to datasets including time series of data points. Therefore, the quality of the generated data must be visually assessed by a human judge, see C Esteban, S L Hyland, G. R. 2017. Real-valued (medical) time series generation with recurrent conditional GANs. In *arXiv preprint arXiv:* 1706.02633.

FIG. 4 is a flowchart of a method according to various examples. The method of FIG. 4 illustrates an example implementation of the execution of the evaluation framework 104, i.e., an example implementation of box 1003 of FIG. 1.

FIG. 4 illustrates a method including continued interaction between a user and the machine in order to evaluate the quality of multiple instances of a generated time series.

The evaluation framework 104 provides multiple views. Based on the multiple views, user inputs are received. Based on the user inputs, it is possible to navigate between the multiple views. Furthermore, based on the user inputs, it is possible to configure the GAN 102 and/or a training process of the GAN 102.

At box 1021, a first view is output. The first view can be labeled iteration view. The first view includes one or more plots that indicate at least one distance measure between multiple instances of the reference time series 101 in multiple instances of the generated time series 103, as a function of the iteration. For example, different plots can illustrate different distance measures. The multiple plots can share an axis associated with the plurality of iterations.

At box 1022, a user input is received that is indicative of a selected iteration of the plurality of iterations, based on the first view.

Then, at box 1023, a second view is output. The second view may be labeled instance view. Here, the one or more plots of the second view include at least an amplitude or phase of the multiple instances of the generated time series 103 for the selected iteration of box 1022, e.g., as a function of time. Alternatively or additionally, the instance view can include the multiple instances of the reference time series 101.

Then, it is possible to obtain, at box 1024, a further user input that is indicative of a selected instance, based on the second view.

At box 1025, it is then possible to output a third view— e.g., labeled selected sample view—that is indicative of the data points of the selected instance of the generated time series (for the selected iteration of the plurality iterations), as indicated by the further user input of box 1024. The third view may include a line plot of the amplitude or phase of the selected instance, as a function of time.

At box 1026, it is then checked whether a further user input is received. The user may navigate back-and-forth between the views, as illustrated in FIG. 4, by means of the further user input.

Otherwise, at box 1027, the GAN 102 and/or the respective training process is configured, based on the previous user inputs.

Next, in connection with FIG. 5 in FIG. 6, details with respect to the various views are explained.

FIG. 5 and FIG. 6 schematically illustrate plots of multiple views provided by the evaluation framework 104 (cf. FIG. 2).

FIG. 5 and FIG. 6 correspond to each other, but the illustrated data is different; this is because a different configuration of GANs is used in FIG. 5 and FIG. 6, as will be explained in further detail below.

FIG. 5 and FIG. 6 illustrate a first view 391 (upper part in FIG. 5 and FIG. 6), the iteration view. The iteration view 391 that includes two plots 301, 302. The two plots 301, 302 share a common axis 312 that is associated with the plurality of iterations.

The iteration view 391 shows at least one distance measure as a function of the iteration.

The iteration view 391 gives the user a general impression about the behavior of GAN as a function of the iterations of the training process.

The user can interactively select interesting iterations in the first view 391 and get more insights about the selected iterations in further views 392, 393. This will permit the user to identify the iteration with the best behavior.

A second view 392 (middle part of FIG. 5 and FIG. 6), the instance view, comprises two plots 321, 322 (note that the plot 322 is provided multiple times). The plots 321, 322 share an axis 311 that is associated with the multiple instances. The plots 321, 322, 331, 332 is provided A third view 393 (lower part and right side of FIG. 5 and FIG. 6)—the selected sample view—includes multiple plots 333-334 to further investigate time series at particular iterations and instances selected by the user. The multiple plots 333-334 share a common axis 313 that is associated with time.

The plots 321-322 of the instance view 392 display the data points of all instances of the time series (plot 321: reference time series; plot 322: generated time series) at a certain iteration, respectively (in FIG. 5, the plot 322 is respectively shown for iterations 40, 198, 382, 614, 769, 899, and 978, respectively; as illustrated by the arrows; these iterations are also highlighted in the plots 301, 302 of the iteration view 391).

A 2-D heatmap is used for the plots 321, 322. The 2-D heatmap encodes, as contrast or color, the amplitude of the data points as a function of instance along axis 311 and as a function of time along axis 313.

Note that two 2-D heatmaps are shown with a shared axis 311 for instance and with a shared axis 313 for time. This makes it possible to compare the generated time series 103 vis-à-vis the reference time series 101. The plots 321, 322 of the instance view 392 allow investigation and exploration of the multiple instances of the generated time series 103 at a certain iteration and compares them to the multiple instances of the reference time series 101.

The plots 331-332 illustrate a time-dependent distribution of the amplitude and/or phase data points for a respective iteration. The plots 331-332 are sometimes labeled time-histogram views, as the show the variation of the data points for a given iteration. As can be seen from FIG. 5 and FIG. 6, the amplitude and/or phase of the data points spreads out; this is consistent with the assumption that different feature classes are represented by the multiple instances.

The instance view 392 is used to depict the data points across multiple instances of the time series for a given iteration and enable a detailed and rigorous exploration of the generated time series and their properties. Each 2-D heatmap represents all the data of a specific iteration where each row corresponds to a specific instance of the time series. This visualization permits the user to compare a high number of time series in an efficient manner.

The user can investigate different iterations at the same time, as shown in FIG. 5 and FIG. 6 (multiple plots 322, 332 are included in the view 392).

The time series of a given instance selected in the instance view 392 can then be visualized as line plots 333-334 of the selected sample view 393. The line plots 333-334 show the time-domain evolution of the amplitude and/or phase of the data points of a given instance of a reference time series and/or a generated time series; and optionally a statistical reference (e.g., a median or average or a percentile taken across all time series of a kind). In plot 333, the amplitude and/or phase are illustrated for the instances highlighted in the plots 322 using a square bracket (light full line; bold full line; dotted line). The plots 333 and 334 of the selected sample view 393 also include a statistical reference of the amplitude of phase of the multiple instances of the reference time series 101 (e.g., percentiles; dashed areas). The plot 334 shows a difference between the data points of a given instance of the generated time series and this statistical reference. A rigorous investigation of some selected time series is made possible with the selected sample view 393. To give the user some insights about the reference time series, the plot 333 depicts the median of the instances of the reference time series and the amount of data falling in the 68th, 95th and 99.7th percentile. The user may add further instances of the reference or generated time series at different iterations, to compare them. The plot 334 highlights the element-wise difference between the selected instance of the generated time series and the median across all instances of the reference time series.

As will be appreciated, the views 391 and 392 include the axis 311 that shows properties as a function of the instance. As a general rule, it would be possible that the multiple instances of the reference time series 101 and/or of the generated time series 103 are sorted. The sorting can arrange the sequence of instances along the axis 311. To make both the reference and generated time series comparable, the same sorting is generally applied to the generated time series and the reference time series.

As a general rule, various sorting criteria are conceivable. For example, sorting can be based on the PCA, or on a user input, or on the at least one distance measure of the iteration view 391. For instance the sorting could be executed prior to box 1021 of FIG. 4.

As a general rule, the sorting based on PCA can be applied to the multiple instances of the reference time series, to transform the data points of each reference time series into uncorrelated components. The multiple instances of the reference time series are then sorted based on the first/primary principal component. For example, the PCA could be trained based on the reference time series of the reference dataset and the applied to the generated time series of the training dataset.

Next, further details with respect to the iteration view 391 will be explained. Here, to get further insights about the properties of the data, a measure of similarity and a dimensionality reduction technique are used.

As a general rule, the least one distance measure can use various underlying distance metrics, e.g., Euclidean Distance (ED) or Dynamic Time Warping (DTW). As a general rule, the user may select a metric for the distance measure. For example, the user may select either ED or DTW. The metric could also be predefined.

As a further general rule, a nearest-neighbor distance can be determined. I.e., it is possible to determine, for a given instance of the generated time series the closest instance of the reference time series (using the respective distance metric)—or vice versa; this minimum distance is then the nearest-neighbor distance.

In the concrete example of FIG. 5 and FIG. 6, the plot 301 corresponds to a first distance measure and the plot 302 corresponds to a second distance measure. The first distance measure of the plot 301 is the Incoming Nearest Neighbor Distances (INND); and the second distance measure of the plot 302 is the Outgoing Nearest Neighbor Distances (ONND). In the example of plots 301, 302 the INND and ONND are also resolved for each one of the multiple instances along axis 311, but this is generally optional. The order of the instances is determined based on sorting, e.g., using the PCA.

The plot 301 illustrates, for each instance of the generated time series, the minimum value of the distance metric to any instance of the reference time series (i.e., the nearest-neighbor distance to the multiple instances of the reference time series), as INNDs. The nearest-neighbor distances are defined within each iteration of the plurality of iterations.

The plot 302 illustrates, for each instance of the reference time series 101, the nearest-neighbor distance to the multiple instances of the generated time series 103, as ONNDs. The calculation of the ONNDs is also illustrated by the pseudocode of table 1 below

TABLE 1

Pseudo-code for calculation of ONNDs of various instances of the reference time series.

-Load all instances of the reference time series
-Select a given iteration
-Load all instances of the generated time series for the selected given iteration
-For each instance of the reference time series
  -For each instance of the generated time series
    -Determine distance between current reference time series and current generated time series
  -Next Instance of the generated time series
  -ONND of the current instance of the reference time series is the minimum across all determined distances
-Next instance of the reference time series The 2-D heatmap plots 301, 302 illustrate INNDs and ONNDs as a function of instances along the axis 311 and as a function of iterations along the axis 312. The intensity of the color of each pixel of the 2-D heatmap plots highlights the value of the INNDs or ONNDs, respectively. In the illustrated example, a dark pixel represents a high distance value, while a brighter pixel denotes a lower distance value.

INNDs and ONNDs give an overview about the overall performance of GAN over the iterations and allow for different types of investigations:

Firstly, are the generated time series 103 becoming more realistic with the iterations, i.e., do the INNDs/ONNDs become smaller as a function of the iterations along the axis 312?

Secondly, are INNDs/ONNDs reaching a stable behavior and indicating nearly constant values, as a function of the iterations along the axis 312?

Thirdly, is the variation/variation strength of the time-domain shapes of the instances of the reference time series representative for the variation strength of the variation strength of the time-domain shapes of the generated time series 103? This is indicated by the ONNDs of the plot 302. The ONNDs thus is indicative of whether all instances of reference time series are equally well represented by the instances of the generated time series, or whether the instances of the generated time series correspond to a limited number of instances of the reference time series. The INNDs, on the other hand are indicative of a similarity between the time-domain shapes of the data points of the generated time series with respect to the reference time series.

Next, an example use case is discussed in concrete terms. This is an example only, but helps to understand the underlying motivation and details of the approach. The use case illustrates that the evaluation framework 104 enables an exploration of the behavior of the GAN over the iterations and an investigation of the similarity between the reference and generated time series. Hence, the presented human-centered approach gives the opportunity to build a relationship of trust between the user and the AI algorithm.

Here, a user tested the proposed method on a GAN model (Mogren, O. 2016. C-rnn-gan: A continuous recurrent neural network with adversarial training. In Constructive MLML Workshop (CIVIL) at NIPS 2016, 1) to generate data based on the reference data set (Goldberger, A. L.; Amaral, L. A. N.; Glass, L.; Hausdorff, J. M.; Ivanov, P. C.; Mark, R. G.; Mietus, J. E.; Moody, G. B.; Peng, C.-K.; and Stanley, H. E. 2000 (June 13). PhysioBank, PhysioToolkit, and PhysioNet: Components of a new research resource for complex physiologic signals. Circulation 101(23):e215-e220. Circulation Electronic Pages: http://circ.ahajournals.org/content/101/23/ e215.full PMID:1085218; doi:10.1161/01.CIR.101.23.e215). The considered reference dataset consists of 7 long-term Electrocardiogram (ECG) for a period of 14 to 22 hours each. It contains two classes depicting the normal and abnormal behavior. To reduce the training time, only 30 time points from the reference time series are considered. The user used one class in his experiments. The performance of GAN is evaluated for two different parameter configurations, namely GAN type 1 and GAN type 2. The corresponding results are depicted in FIGS. 5 and 6, respectively.

The GAN Iteration Views 391 depicts the INNDs and ONNDs depending on the iterations and instances. The first iterations for both scenarios are characterized by high INND and ONND (dark pixels in the heatmap plots 301, 302 of the iteration view 391). As the number of iterations increases, an improvement in terms of INND can be seen. Hence, the generated data are progressively reaching similar values to the original data and the performance of the GAN is increasing with a growing number of iterations. However, the INNDs for GAN type 1 sharply increase at some iterations, e.g., between iteration 600 and 900. GAN type 2 is showing a more stable behavior. In fact, after approximately 300 iterations, the INNDs are almost constant. ONNDs in plot 302 of the iteration view 391 of FIG. 5 show that the ONNDs at the top and bottom of the sorted iterations are still high (red circles in FIG. 5). As the instances of the reference time series are sorted with PCA, the expert concludes that the reference time series with an important shift are characterized by a high ONND. Hence, the multiple instances of the generated time series 103 produced by the first GAN are similar to a specific type of the multiple instances of the reference time series 101, namely the instances that are sorted in the middle (i.e., similar to the respective one or more feature classes). The expert hypothesizes that GAN model type 1 was not able to reproduce the shift present in the real data and is collapsing to one mode (mode collapse); not all feature classes of the multiple instances of the reference time series are reproduced. In contrast to GAN type 1, ONNDs illustrated in plot 302 of FIG. 6 depict a low ONND for all instances of the reference time-series. ONNDs helped the user to verify that the instances of the generated time series are diverse (i.e., show an appropriate variation strength) and do not correspond to a specific feature class, but to almost all real ones.

Afterwards, the user selects some interesting iterations in the iteration view 391 and continues his investigation in the instance view 392. For both scenarios, the user selected an iteration at the beginning of the training process, certain iterations with low INNDs in the middle of the training process, few iterations characterized by high INND and ONND in GAN type 1 and 2, and some iterations showing a stable behavior within the last hundred iterations of the training process.

At the early iterations of the training process, the time-dependent distribution of data points of the generated time series was completely different from the time-dependent distribution of the data points of the reference time series 101. An improvement in the performance is noticeable after approximately 200 iterations. In general, the time-dependent distribution and the quality of the generated time series are becoming more realistic over the iterations. An enhancement in the results is observed between the iterations 382, 614 and 899 for GAN type 1 (FIG. 5) and the iterations 386 and 669 for GAN type 2 (FIG. 6).

To inspect the behavior of GAN type 1 rigorously, the user selected some instances of the generated time series at different iterations. In the selected sample view 393, he noticed that at iteration 764 the data points of the generated time series exhibit a strange peak and at iteration 40 noise is generated. Hence, the evaluation framework 104 helped the user to detect if the data are noisy or have a different behavior from the real data.

Accordingly, both GAN types were not able to generate realistic time series in the first iterations of the training process at all; the performance increased for subsequent iterations of the training process. However, the data quality can decrease drastically and suddenly, after only a single iteration, i.e. iterations 769 and 480 in the GAN type 1 scenario of FIG. 5 and in the GAN type 2 scenario of FIG. 6, respectively. The user confirms that this is an expected behavior with neural networks because their performance is not monotonic.

An analysis of the last hundred iterations of the training process allows the user to find an iteration with the best result; this facilitates configuring the GAN accordingly. This corresponds to iteration 978 for GAN type 1 in FIG. 5 and iteration 926 for GAN type 2 in FIG. 6. In both cases, the generated time series are smooth and realistic. However, the 2-D histogram plots 322 of the instance view 392 for GAN type 1 in FIG. 5 is still different from the respective plot 321 of the instances of the reference time series. For the time-histogram plots 331, 332 also differ from each other. Moreover, ONND of plot 302 for GAN type 1 demonstrates that the samples are not as diverse as in the instances of the reference time series. A rigorous investigation of these time series in the selected sample view 393, e.g., plot 333, shows that all the generated data are falling in the 68th percentile (a statistical reference) of the instances of the reference time series and are too close to the median i.e. their variation strength is low. This confirms the earlier hypothesis of the user when he observed the iteration view 391. Thus, the user was able to easily detect the mode collapse phenomenon, one of the hardest training problems for GAN. In order to avoid this problem, the user used in GAN type 2 a normal distributed noise instead of the uniformly distributed noise and applied a technique introduced in Salimans, T.; Goodfellow, I.; Zaremba, W.; Cheung, V.; Radford, A.; Chen, X.; and Chen, X. 2016. Improved techniques for training gans. In Lee, D. D.; Sugiyama, M.; Luxburg, U. V.; Guyon, I.; and Garnett, R., eds., Advances in Neural Information Processing Systems 29. Curran Associates, Inc. 2234-2242, namely mini-batch discrimination. As a general rule, various options are available to configure the GAN appropriately; i.e., not just those two mentioned above. In contrast to GAN type 1, GAN type 2 is re-producing the distribution of the instances of the reference time series much better: the ONND of plot 302 shows smaller values across all instances along axis 311 (the plot 302 has more white pixels for FIG. 6 than for FIG. 5). Also, the time-histogram plots 332 resemble the time-histogram plots 331 at least for some iterations.

For even further exploration, the user selected different instances time series from the instance view 392 and visualized them in the selected sample view 393. The generated data prove that GAN type 2 is reproducing the shift present in the time-domain shapes of the data points of the instances of the reference time series. The variation strength is higher. Differences to statistical median exist.

As a last step, our expert used the view 393 to directly compare the time-domain shape of the data points of a given instance of the generated time-series to the time-domain shape of the data points of a given instance of the reference time series. This is illustrated in FIG. 6 for plots 333 and 334. The behavior of the data points of the generated time series is similar to the behavior of the data points of the reference data.

Hence, the second GAN type 2 presents a more realistic behavior and was able at iteration 926 to generate time series that are rare in the real dataset. The user concludes that GAN type 2 is achieving the desired behavior. Hence, the proposed evaluation framework helped the users to find a trustworthy GAN configuration with a set of parameters producing the best results.

FIG. 7 schematically illustrates a device 701. The device 701 includes a processor 701 and a memory 702. The processor 701 can load program code from the memory 702. The processor 701 can execute the program code. This causes the processor 701 to perform techniques as described herein, e.g.: obtaining a reference dataset, e.g., via a data interface 703; performing a training process of a GAN; configuring a GAN based on user input; executing an evaluation framework; outputting views to a user via an HMI 704; receiving user input via the HMI 704; outputting a training dataset obtained from executing the GAN, e.g., via the data interface 703; etc. The processor 701 could execute the methods of FIG. 1 or FIG. 4.

Summarizing, above techniques pertaining to a visual approach to evaluate and optimize GANs generating time series data have been described. The proposed evaluation framework is based on at least one visualization techniques, namely a distance measure across multiple iterations, as well as a view for one or more selected iteration including all instances. The distance measure is used in a sophisticated manner to compute the INNDs and ONNDs. The evaluation framework supports users in the evaluation process. Experts can detect that a configuration of a GAN generates samples which are not diverse. Also, it is possible to verify that a mapping between the generated and the real data is clear, i.e. the generated samples should correspond to an easily recognizable class. Other developments are planned to allow for increased transparency and deeper understanding of the GAN algorithm such as: additional views that highlight the decision making process of the discriminator and an efficient comparison between data generated from different GAN configurations.

For illustration, above, various examples have been described in which the data generation algorithm is implemented by a GAN. Other kinds and types of data generation algorithms are conceivable.

For further illustration, various examples have been described for a scenario in which the data generation algorithm generates a generated dataset that implements a training dataset for training an ML algorithm. Similar techniques as described above can be readily applied for other purposes of the generated dataset, e.g., for a test dataset, etc.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of configuring a data generation algorithm for generating a generated dataset of technical data, the generated dataset implements a training dataset for training a machine learning algorithm, the generated dataset comprising a generated time series of data points, the method comprising:
  obtaining multiple instances of a reference time series of data points;
  based on the multiple instances of the reference time series: iteratively adjusting a configuration of the data generation algorithm and executing the data generation algorithm with the respectively adjusted configuration, to thereby obtain a plurality of iterations of multiple instances of a generated time series of data points;
  outputting, to a human-machine-interface, a first view of at least one distance measure between the multiple instances of the reference time series and the multiple instances of the generated time series as a function of the plurality of iterations;
  obtaining, from the human-machine-interface, a user input indicative of a selected iteration of the plurality of iterations;
  training the machine learning algorithm using the generated dataset obtained from the selected iteration of the plurality of iterations; and
  applying the trained machine learning algorithm to detect and classify features in technical time series of data points
  wherein the at least one distance measure comprises a first distance measure which is based on nearest-neighbor distances of each of the multiple instances of the generated time series to the multiple instances of the reference time series.

2. The method of claim 1, wherein the at least one distance measure comprises a second distance measure which is based on nearest-neighbor distances of each of the multiple instances of the reference time series to the multiple instances of the generated time series.

3. The method of claim 1, wherein the first view comprises a first plot of the first distance measure and further comprises a second plot of the second distance measure, and the first plot and the second plot have a common axis associated with the plurality of iterations.

4. The method of claim 3, wherein the first plot and the second plot of the first view include 2-D heatmap plots for the first distance measure and the second distance measure as a function of the plurality of iterations and a function of the multiple iterations.

5. The method of claim 1, wherein the at least one distance measure comprises a first distance measure indicative of a similarity between time-domain shapes of the data points of the generated time series with respect to the reference time series.

6. The method of claim 1, wherein the at least one distance measure comprises a second distance measure indicative of a variation strength of time-domain shapes of the data points of the generated time series with respect to the reference time series.

7. The method of claim 1, wherein the first view comprises at least one plot showing the at least one distance measure for each one of the multiple instances of the reference time series and/or the generated time series.

8. The method of claim 1, further comprising:
  outputting, to the human-machine-interface, a second view comprising an amplitude or phase of the multiple instances of the generated time series for the selected iteration of the plurality of iterations.

9. The method of claim 8, wherein:
the second view comprises a first plot in which the amplitude or phase of the multiple instances of the reference time series is shown,
the second view comprises a second plot in which the amplitude or phase of the multiple instances of the generated time series is shown for the selected iteration of the plurality of iterations, and
the first plot and the second plot share a common axis for the multiple instances.

10. The method of claim 9, wherein the plot of the second view comprises 2-D heatmaps for the amplitude or phase of the selected iteration of the plurality of iterations of the generated time series and of the reference time series, as a function of the multiple iterations and as a function of time.

11. The method of claim 9, further comprising:
obtaining, from the human-machine-interface, a further user input indicative of a selected instance of the multiple instances of the selected iteration of the plurality of iterations; and
outputting, to the human-machine-interface, a third view indicative of the amplitude or phase of the selected instance of the multiple instances of the selected iteration of the plurality of iterations, as a function of time.

12. The method of claim 1, further comprising:
sorting at least one of the multiple instances of the reference time series or the generated time series.

13. The method of claim 1, further comprising:
based on the user input, configuring at least one of the data generation algorithm or a training process of the data generation algorithm.

14. A device comprising a control circuitry configured to:
obtain multiple instances of a reference time series of data points;
based on the multiple instances of the reference time series: iteratively adjust a configuration of the data generation algorithm and executing the data generation algorithm with the respectively adjusted configuration, to thereby obtain a plurality of iterations of multiple instances of a generated time series of data points;
output, to a human-machine-interface, a first view of at least one distance measure between the multiple instances of the reference time series and the multiple instances of the generated time series as a function of the plurality of iterations;
obtain, from the human-machine-interface, a user input indicative of a selected iteration of the plurality of iterations;
train the machine learning algorithm using the generated dataset obtained from the selected iteration of the plurality of iterations; and
apply the trained machine learning algorithm to detect and classify features in technical time series of data points
wherein the at least one distance measure comprises a first distance measure which is based on nearest-neighbor distances of each of the multiple instances of the generated time series to the multiple instances of the reference time series.

* * * * *